US010921477B2

(12) United States Patent
Li et al.

(10) Patent No.: US 10,921,477 B2
(45) Date of Patent: Feb. 16, 2021

(54) METHOD, APPARATUS, AND SYSTEM FOR ELIMINATING FREQUENCY DISPERSION EFFECT

(71) Applicant: PetroChina Company Limited, Beijing (CN)

(72) Inventors: Chuang Li, Beijing (CN); Jianguo Pan, Beijing (CN); Hongbin Wang, Beijing (CN); Jianguo Zhao, Beijing (CN); Linjun Huang, Beijing (CN); Dong Sun, Beijing (CN); Chao Feng, Beijing (CN); Qingzhou Yao, Beijing (CN); Yanfang Gao, Beijing (CN)

(73) Assignee: PetroChina Company Limited, Beijing (CN)

( * ) Notice: Subject to any disclaimer, the term of this patent is extended or adjusted under 35 U.S.C. 154(b) by 388 days.

(21) Appl. No.: 16/108,848

(22) Filed: Aug. 22, 2018

(65) Prior Publication Data

US 2019/0293822 A1 Sep. 26, 2019

(30) Foreign Application Priority Data

Mar. 23, 2018 (CN) .......................... 2018 1 0244000

(51) Int. Cl.
*G01V 1/48* (2006.01)
*G01V 1/42* (2006.01)
(Continued)

(52) U.S. Cl.
CPC .................. *G01V 1/48* (2013.01); *G01V 1/24* (2013.01); *G01V 1/282* (2013.01); *G01V 1/42* (2013.01)

(58) Field of Classification Search
CPC . G01V 1/48; G01V 1/24; G01V 1/282; G01V 1/42; G01V 1/36; G01V 1/40; G01V 2210/59
See application file for complete search history.

(56) References Cited

U.S. PATENT DOCUMENTS 6,147,929 A 11/2000 Parra
2019/0293822 A1* 9/2019 Li .............................. G01V 1/48

FOREIGN PATENT DOCUMENTS

CN 101013161 8/2007
CN 101533103 A 9/2009
(Continued)

OTHER PUBLICATIONS

Search Report (non-English) dated Feb. 26, 2018, from CN application No. 2018102440004, 5 pages.
(Continued)

*Primary Examiner* — Daniel Pihulic
(74) *Attorney, Agent, or Firm* — Meunier Carlin & Curfman LLC

(57) ABSTRACT

The present disclosure disclose a method, an apparatus and a system for eliminating a frequency dispersion effect, wherein the method comprises: testing a core sample to obtain logging band velocities and seismic band velocities under different pressures; fitting a relationship between a stratum pressure and the logging band velocity using the logging band velocities under different pressures, and fitting a relationship between the stratum pressure and the seismic band velocity using the seismic band velocities under different pressures; and eliminating a frequency dispersion effect in a target area using the relationship between the stratum pressure and the logging band velocity and the relationship between the stratum pressure and the seismic band velocity.

11 Claims, 11 Drawing Sheets

(51) Int. Cl.
*G01V 1/28* (2006.01)
*G01V 1/24* (2006.01)

(56) References Cited

FOREIGN PATENT DOCUMENTS

| | | | | |
|---|---|---|---|---|
| CN | 103235338 | | 8/2013 | |
| CN | 104656142 | | 5/2015 | |
| CN | 106646615 A | | 5/2017 | |
| CN | 107065013 | | 8/2017 | |
| CN | 107315194 A | | 11/2017 | |
| CN | 206740550 | | 12/2017 | |
| CN | 107605469 A | | 1/2018 | |
| CN | 108562938 B | * | 9/2019 | ............... G01V 1/42 |

OTHER PUBLICATIONS

Matching between acoustic logging data and seismic data—wave velocity dispersion correction, Petroleum geophysical exploration.
Wang, H. et al., Velocity dispersion and attenuation of seismic wave propagation in rocks, Acta Petrolei Sinica, vol. 33, No. 2, Mar. 2012 and English Language Abstract.
First Office Action and search report dated May 8, 2019 for counterpart Chinese patent application No. 201810244000.4, along with machine English translation downloaded from EPO.

* cited by examiner

METHOD, APPARATUS, AND SYSTEM FOR ELIMINATING FREQUENCY DISPERSION EFFECT

CROSS-REFERENCE TO RELATED APPLICATIONS

This application claims priority to Chinese Patent Application No. 201810244000.4, filed on Mar. 23, 2018, which is hereby incorporated by reference in its entirety.

TECHNICAL FIELD

The embodiments of the present disclosure relate to the field of seismic data processing technologies, and particularly, to a method, an apparatus, and a system for eliminating a frequency dispersion effect between seismic data and logging data.

BACKGROUND ART

The seismic exploration technology is currently the main method for oil and gas explorations, but the method is limited for the ancient Ordovician-Cambrian carbonate stratums in Chinese western basins, and the limitations are mainly as follows.

1. The seismic resolution is insufficient. The buried depth of ancient carbonatite is more than 5,000 meters, the main frequency of seismic data is about 20 to 25 Hz, the stratigraphic vertical identification thickness is about 70 meters, and the reservoir thickness is generally several to more than ten meters. Obviously, the seismic resolution cannot meet the requirement.

2. The seismic signal to noise ratio is low. For example, in the central Tarim area of the Tarim Basin, the earth surface is a dune landform, the stratigraphic buried depth is large, and the signal to noise ratio of a target stratum is relatively low. In particular, the low-porosity reservoirs without obvious geophysical response are seriously affected by various random noises.

In order to meet the deep carbonate exploration requirement, it is necessary to further improve the representation accuracy of the seismic prediction. There are mainly two ways to improve the longitudinal resolution of the carbonate stratums:

1. To improve the seismic acquisition quality and optimize the seismic processing links, so as to achieve multiple coverages and high-density acquisitions; the models which are consistent with actual stratums should be considered as much as possible for the indoor data imaging modeling, so as to optimize the model parameters, and improve the imaging quality.

2. The combination of multiple data may be used to improve the seismic vertical resolution. The drilling data reveals the true stratum information; the vertical resolution of various logging data is much higher than that of the seismic data; the combined interpretation with the logging data and the seismic data can effectively increase the stratigraphic vertical resolution.

The seismic acquisition is generally one-off for the seismic technology industrial applications in a certain region, while after the multi-parameter debugging, the indoor imaging processing preferably uses seismic data with a high imaging quality for the follow-up studies. For the practical exploration workers, the most widely used method is the multi-data combined analysis, and the most common is the combined application of the acoustic logging data and the seismic records.

The acoustic logging data acquisition frequency is about one KHz, while the seismic main frequency is about tens of Hz, and there is a significant frequency difference between them. According to the porous media theory, the underground rock pores contain oil, gas or salt water, so when waves of different frequencies are propagated therein, there occurs a phenomenon that the velocity varies with the frequency, i.e., the "frequency dispersion" effect.

When two types of data is used in combination, if the velocity difference between them cannot be eliminated, it will lead to an increase in the uncertainty of the follow-up works, and even an erroneous result.

Those skilled in the art always know the existence of the frequency dispersion phenomenon. However, it is difficult to observe the frequency dispersion characteristics, and the variation in the stratum velocity corresponding to different frequencies cannot be determined. In a case where the acoustic logging data and the seismic data are used in combination, if any significant data mismatch is found, the stratum velocity of acoustic logging can only be adjusted by estimating the frequency dispersion characteristic value. This practice requires the technicians to have certain experiences, and the accuracy of the frequency dispersion characteristic value cannot be ensured. As a result, even if the frequency dispersion effect is eliminated, the uncertainty of the follow-up work will still be increased.

SUMMARY

An objective of the embodiments of the present disclosure is to provide a method, an apparatus and a system for eliminating a frequency dispersion effect between seismic data and logging data, so as to solve the technical problem of how to accurately eliminate the frequency dispersion effect.

In order to achieve the above objective, the embodiments of the present disclosure provide a method for eliminating a frequency dispersion effect, comprising:

testing a core sample to obtain logging band velocities and seismic band velocities under different pressures;

fitting a relationship between a stratum pressure and the logging band velocity using the logging band velocities under different pressures, and fitting a relationship between the stratum pressure and the seismic band velocity using the seismic band velocities under different pressures; and eliminating a frequency dispersion effect in a target area using the relationship between the stratum pressure and the logging band velocity and the relationship between the stratum pressure and the seismic band velocity.

In order to achieve the above objective, the embodiments of the present disclosure provide an apparatus for eliminating a frequency dispersion effect, comprising a memory, a processor, and a computer program stored in the memory and runnable in the processor; when executing the computer program, the processor performs the operations of:

testing a core sample to obtain logging band velocities and seismic band velocities under different pressures;

fitting a relationship between a stratum pressure and the logging band velocity using the logging band velocities under different pressures, and fitting a relationship between the stratum pressure and the seismic band velocity using the seismic band velocities under different pressures; and eliminating a frequency dispersion effect in a target area using the relationship between the stratum pressure and the logging band velocity and the relationship between the stratum pressure and the seismic band velocity.

In order to achieve the above objective, the embodiments of the present disclosure provide a system for eliminating a frequency dispersion effect, comprising:

a test device, a data recording device, a data processing device and a frequency dispersion effect processor, wherein, the test device is configured to test a core sample;

the data recording device is configured to record related data generated during a test of the core sample by the test device;

the data processing device is configured to process the related data to obtain logging band velocities and seismic band velocities under different pressures; fit a relationship between a stratum pressure and the logging band velocity using the logging band velocities under different pressures, and fit a relationship between the stratum pressure and the seismic band velocity using the seismic band velocities under different pressures; and the frequency dispersion effect processor is configured to eliminate a frequency dispersion effect in a target area using the relationship between the stratum pressure and the logging band velocity and the relationship between the stratum pressure and the seismic band velocity.

It is clear that as compared with the prior art, the frequency dispersion increment correction in this technical solution can be used in each link of the seismic exploration and interpretation to further improve the time-depth matching relation and the representation accuracies of the reservoir and fluid. The reliability of the spatial position of the reservoir in the time domain is improved during the exploration and development. Through the consistency of seismic-logging data, the quantitative interpretation accuracy of the reservoir inversion result is improved, the oil-water boundary is accurately predicted, the resource amount is accurately estimated, and the drilling ratio, drilling success rate, and recovery efficiency of the reservoir are improved.

BRIEF DESCRIPTION OF DRAWINGS

In order to more clearly describe the technical solutions in the embodiments of the present disclosure or in the prior art, the drawings to be used in the description of the embodiments or the prior art will be briefly introduced below. Obviously, the drawings in the following description merely illustrate some embodiments of the present disclosure, and those skilled in the art can obtain other drawings from them without paying any creative labor.

DESCRIPTION OF EMBODIMENTS

Figure 1:
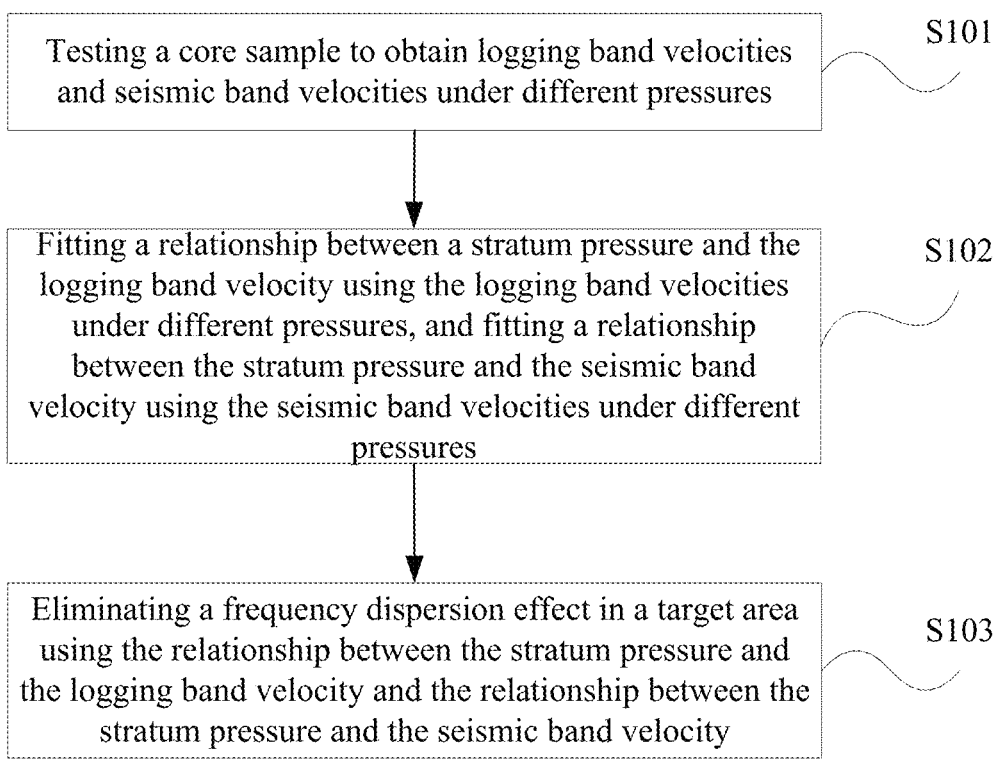
FIG. 1 is a flowchart of a method for eliminating a frequency dispersion effect provided in an embodiment of the present disclosure.

In order that those skilled in the art can better understand the technical solutions in the present disclosure, the technical solutions in the embodiments of the present disclosure will be described clearly and completely as follows with reference to the drawings in the embodiments of the present disclosure. Obviously, those described are merely parts, rather than all, of the embodiments of the present disclosure. Based on the embodiments in the present disclosure, any other embodiment obtained by those skilled in the art without paying any creative labor should fall within the protection scope of the present disclosure.

Those skilled in the art always know the existence of the frequency dispersion phenomenon. The logging velocity acquisition frequency involved in the petroleum exploration is in a level of kHz, while the seismic acquisition excitation focus frequency is in a level of tens to hundreds Hz, and there is an obvious frequency difference therebetween. The frequency dispersion phenomenon refers to a phenomenon that the velocity of underground fluid-containing rocks varies with the frequency. In general, the velocity increases as the frequency rises, so the logging velocity of the underground oil reservoir will be slightly higher than the seismic velocity. Due to the technical limitations, the influence caused by the frequency dispersion effect cannot be measured. From the 20$^{th}$ century to the beginning of the 21$^{st}$ century, due to the limitations in the laboratory observation methods, it was impossible to perform intermediate (logging) and low (seismic) frequency velocity tests on the rock samples, and then possible to compare the velocity differences between different frequencies. When geophysical workers make seismic interpretations, they should firstly determine the seismic reflection interface of each stratum through the seismic-logging data in combination with the time-depth calibration. In fine explorations, the accuracy of the time-depth matching is specially emphasized to ensure the accurate positioning of the thin reservoir or reservoir segment on the seismic profile. Due to the difference between the logging velocity and the seismic imaging velocity, in order to make the synthetic seismic record have a high correlation with the near-well seismic record, the time-depth calibration usually adjusts the matching and eliminates the velocity difference by "stretching" or "compressing" the logging curves. This requires enough interpretation experiences and different results are obtained by different operators, so there is strong uncertainty.

Based on the above reasons, the objective of this case is to obtain the frequency dispersion characteristics of the fluid-containing rocks in a target stratum of a certain region, so as to eliminate the mismatching between the values of the seismic velocity and of the acoustic logging velocity.

In the past, the laboratories adopted a method of obtaining the propagation time of ultrasonic waves in a rock sample to test a longitudinal wave velocity in a high frequency band, the variation in a wavelength of a high frequency signal is about 1 cm to 5 cm. The signal waveform can be distinguished to complete the test once the size of the rock sample satisfies one wavelength. The wavelength of the low frequency signal is about 120 to 200 meters, while the test of the low frequency data in the conventional ultrasonic pulse method requires acquiring a core sample having a length of several tens of meters to distinguish the waveform of the received signal, which is obviously impossible.

In recent years, the low frequency Young modulus and Poisson ratio of rock can be obtained using the resonant bar method and the stress-strain method, so as to indirectly calculate the longitudinal wave velocity of the rock in the low frequency state. In addition, the test data can be obtained as long as the core sample has a diameter of 3.8 cm and a length of about 5 cm. This technical solution is based on a full-band test of the core sample in the laboratory. The stress-strain method can test low-intermediate frequency data, the DARS can test intermediate frequency data, and the ultrasonic pulse method can test high frequency data. The combination of these three methods can obtain low, intermediate, and high frequency full-band data.

Here, the definitions of the laboratory test data and the engineering logging data are explained: the longitudinal wave velocities obtained by testing the core in the laboratory are classified into low frequency (5 to 100 Hz) velocities, intermediate frequency (1000 to 2000 Hz) velocities, and high frequency (0.5 to 1 MHz) velocities according to the frequency variations, and the test environment simulates the pressure varying range (0 to 60 MPa); the frequencies of the engineering application seismic data and of the engineering logging data correspond to the laboratory low and intermediate frequencies, but the test environment is different, and generally the stratum pressure is about 100 to 120 MPa; thus, even if the laboratory data and the engineering logging data is at the same frequency, they cannot be directly calibrated with each other because the stratum pressures are different; in the engineering data, the velocity corresponding to the seismic frequency is usually unknown, and should be calibrated with the laboratory low frequency data. Due to the different stratum pressures, those skilled in the art will not easily associate the laboratory test data with the engineering logging data. However, this technical solution overcomes this barrier by establishing an association between the laboratory intermediate frequency data and the engineering logging data, thereby calculating the engineering seismic velocity using the laboratory test low frequency data. The high frequency data is only used to calibrate the intermediate and low frequency test results and is merely taken as a reference for the upper limit value. Finally, according to the technical solution, the longitudinal wave velocity of the rock is obtained using the association between the laboratory intermediate frequency data and the engineering logging data, and then the frequency dispersion relationship is obtained according to the elastic parameters of the rock to correct the frequency dispersion amount of the target area.

Based on the above description, an embodiment of the present disclosure proposes a method for eliminating a frequency dispersion effect, as illustrated in FIG. 1, comprising:

step 101): testing a core sample to obtain logging band velocities and seismic band velocities under different pressures.

In this embodiment, the basic research data of a research area is collected, including: core drilling, acoustic logging curve, density curve, and seismic record data. Firstly, cores of a target stratum of the research area are collected and preprocessed. The cores are collected and subjected to the laboratory test and sample preparation; corresponding depths of the drilled core samples are recorded; a core sample with a diameter of 3.8 cm and a length of more than 5 cm is drilled from the target stratum of the research area, and the surface of the core sample is grinded and polished; and the samples containing residual crude oil or bitumen should be immersed in an organic solution for decontamination processing.

In this embodiment, the acoustic logging curve refers to a logging velocity curve that records the logging velocity at each sampling point underground; the density curve is taken as a reference compared with the laboratory test density; the acoustic logging curve and the density curve are used for the environmental correction processing and the multi-well consistency processing, so as to eliminate the system errors caused by the collection instrument, the borehole wall collapse, etc.

In this embodiment, the file format of the seismic record is the SGY format. The seismic record is loaded in the interpretation system, and the target stratum is tracked and interpreted. In practice, the seismic data is standard data, and used to calibrate the logging data in this solution. In general, the logging velocity is slightly larger than the seismic velocity, so it is necessary to perform a "velocity reduction" processing to the logging velocity, so as to eliminate the frequency dispersion phenomenon.

Figure 2:
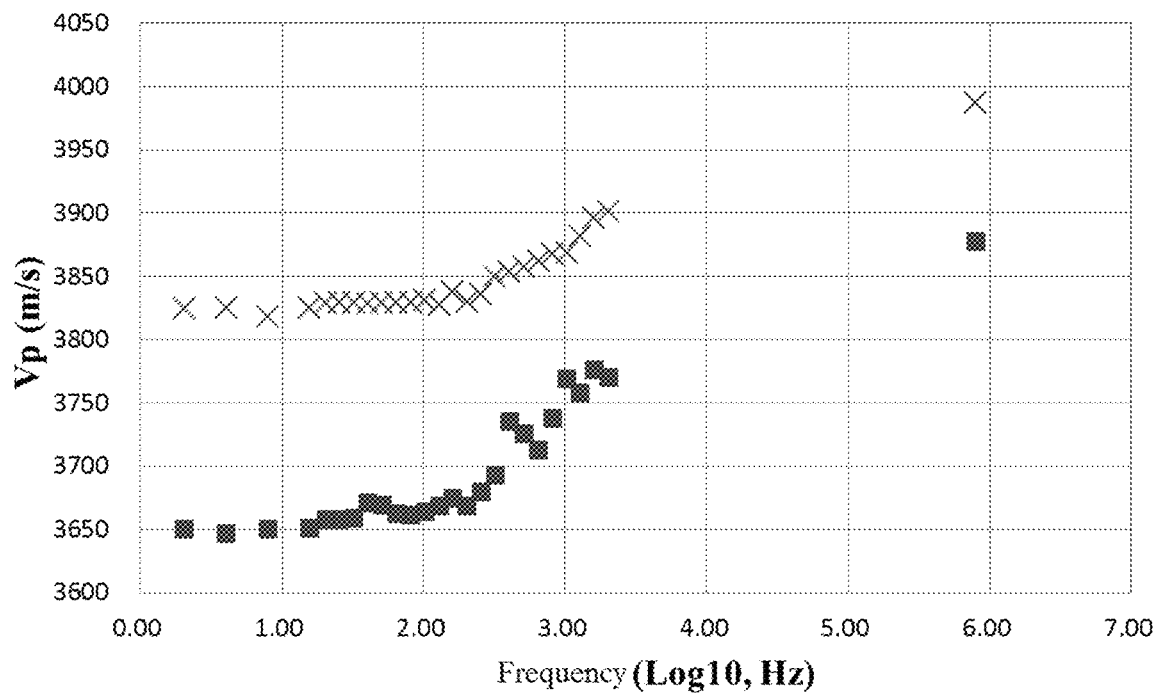
FIG. 2 is a schematic diagram of test results of variations in a longitudinal wave velocity of a core sample along with a frequency under different pressures.

In this embodiment, laboratory tests of the core samples are conducted using the experimental method published by Michael Batzle. In order to simulate the real fluid flow mechanism, the rock sample should be filled with fluid with physical properties similar to those of the actual stratum. As illustrated in FIG. 2, this solution can obtain the longitudinal wave velocity of the core sample varying with the frequency under different pressures, on conditions that the external pressure is 0 to 60 MPa and the frequency ranges from 5 Hz to 2 KHz.

The laboratory cannot simulate the actual stratum environment, and the experimental results obtained cannot be directly used to calculate the frequency dispersion amounts of data of different frequencies in the research area. However, the fitted mathematical relationship implies the variation trend of the frequency dispersion, and it can be used in combination with the actual logging data and the seismic acquisition data to calculate the velocity increment between the seismic band and the logging band.

Step 102): fitting a relationship between a stratum pressure and the logging band velocity using the logging band velocities under different pressures, and fitting a relationship between the stratum pressure and the seismic band velocity using the seismic band velocities under different pressures.

Figure 3:
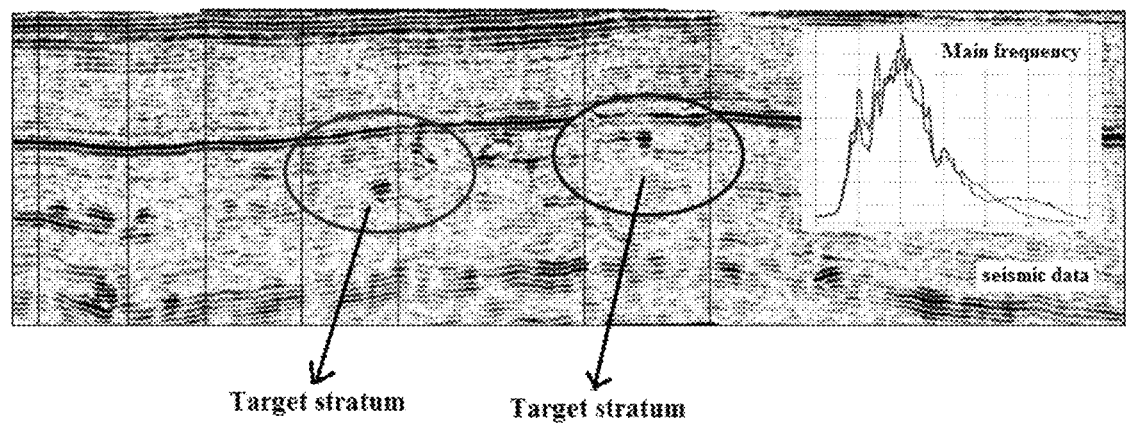
FIG. 3 is a schematic diagram of a main frequency analysis for seismic data.

In this embodiment, the vibration source frequency of the logging instrument is 1 KHz, so the frequency of the logging data is determined. The main frequency of the seismic data is obtained from the seismic data, as illustrated in FIG. 3. The seismic data is added into the Landmark interpretation system; at least two seismic data of the target stratum of the research area is selected for the frequency analysis to obtain seismic main frequencies, respectively, and an average value is taken as the final seismic main frequency. In this embodiment, in consideration of the horizontal variation in the stratum, at least two target stratum data is selected to analyze the main frequency characteristics to calculate the average value, and the actual average seismic main frequency is 20 Hz. The logging data has the acoustic time difference logging frequency according to the logging instrument manual. According to the analysis of the actual data, the seismic data main frequency is 20 Hz, and the logging data frequency is 1000 Hz.

Figure 4:
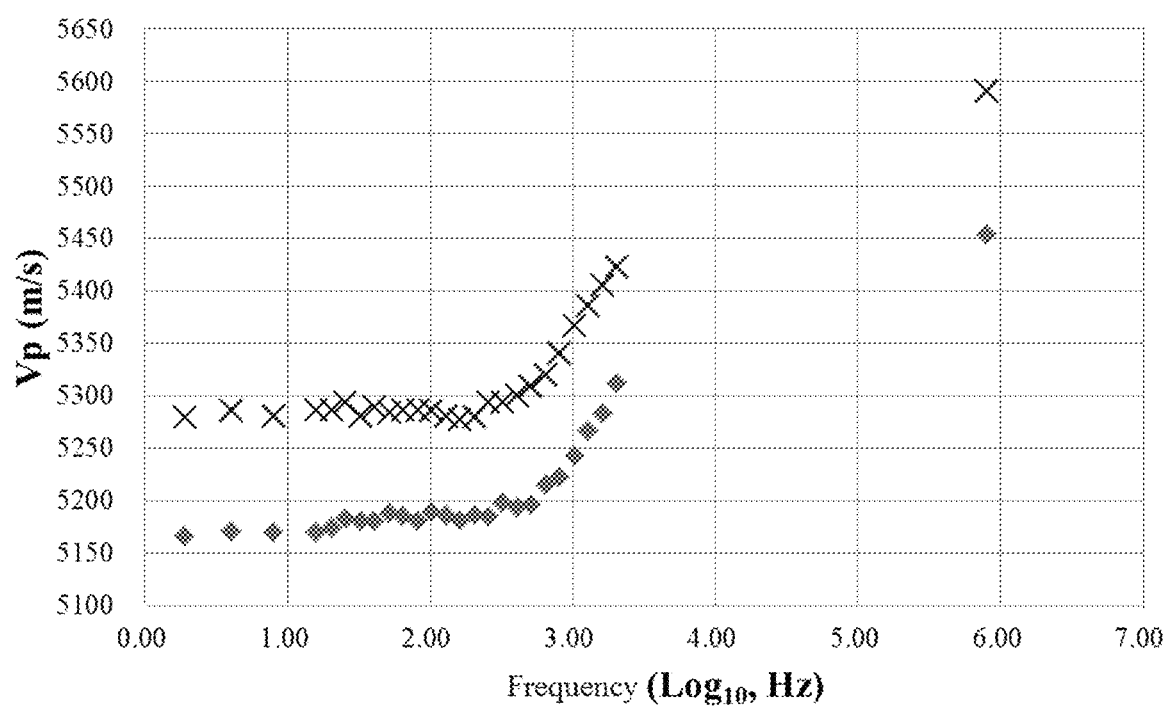
FIG. 4 is a schematic diagram of corresponding values of logging velocities and seismic velocities of Well X2 under different pressures.
Figure 5:
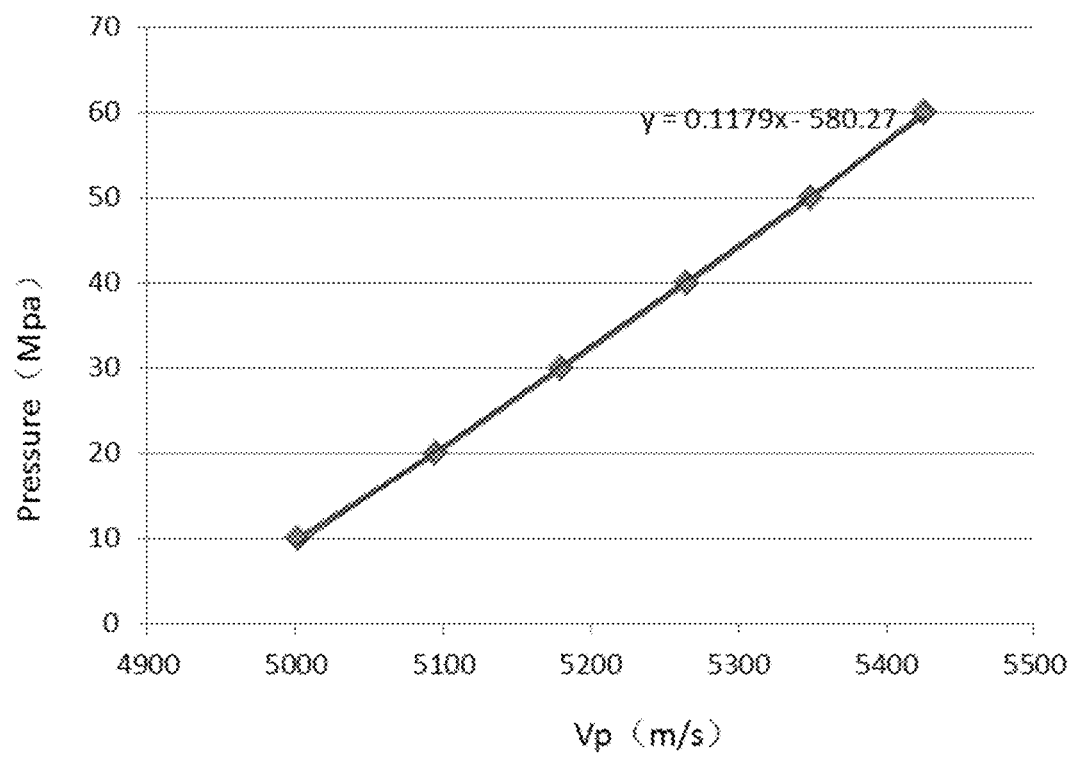
FIG. 5 is a schematic diagram of a linear trend line between a seismic velocity and a pressure variation.
Figure 6:
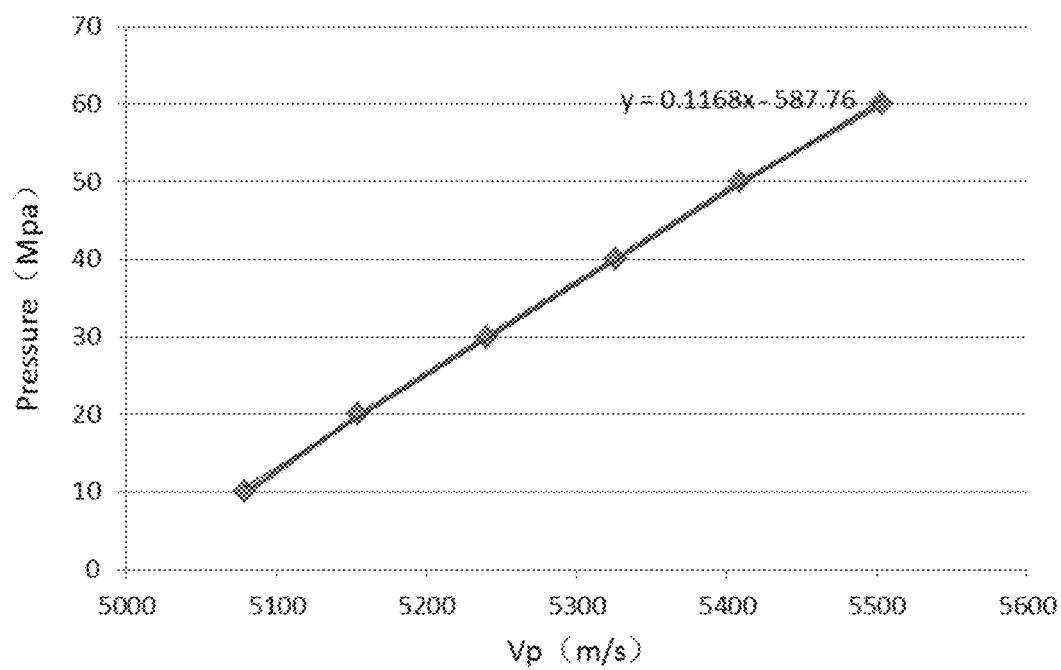
FIG. 6 is a schematic diagram of a linear trend line between a logging velocity and a pressure variation.

Taking Well X2 as an example, in the laboratory, a rock sample is tested with velocities corresponding to reading frequencies of 20 Hz and 1 KHz under the pressures of 10 MPa, 20 MPa, 30 MPa, 40 MPa, 50 MPa, and 60 MPa, respectively, as illustrated in FIG. 4. Two sets of data can be obtained: one set of data is composed of six scatter points of 20 Hz with their velocities varying with the pressure, and the linear trend line between the seismic channel velocity and the pressure variation can be fitted using these six scatter points, as illustrated in FIG. 5. The relationship between the seismic band velocity and the pressure variation is $Ys(tz201)=0.1179Xs(tz201)-580.27$, wherein Ys denotes a stratum pressure corresponding to the seismic band velocity, and Xs denotes the seismic band velocity. The other set of data is composed of six scatter points of 1 KHz with their velocities varying with the pressure, and the linear trend line between the logging band velocity and the pressure variation can be fitted using these six scatter points, as illustrated in FIG. 6. The relationship between the logging band velocity and the pressure variation is $Yw(tz201)=0.1168Xw(tz201)-587.78$, wherein Yw denotes a stratum pressure corresponding to the logging band velocity, and Xw denotes the logging band velocity. As can be seen from the fitting result, the velocity varies with the pressure substantially linearly.

The measured logging data is obtained under the actual stratum pressure conditions, and the stratum pressure can be inversely calculated by substituting the measured logging data into the fitting relationship between the logging band velocity and the pressure variation. The acoustic logging reading of the Well X2 at the test point is 6060 m/s, which is substituted into the relationship $Yw=0.1168Xw-587.78$ to calculate that the stratum pressure is 120 MPa. Next, the velocity of the seismic band under the same stratum pressure is calculated as 5886 m/s by substituting the value of the stratum pressure into the relationship between the seismic band velocity and the pressure variation. Thus, it is acquired that the seismic and logging velocity difference is 174 m/s.

Step 103): eliminating a frequency dispersion effect in a target area using the relationship between the stratum pressure and the logging band velocity and the relationship between the stratum pressure and the seismic band velocity.

Figure 7:
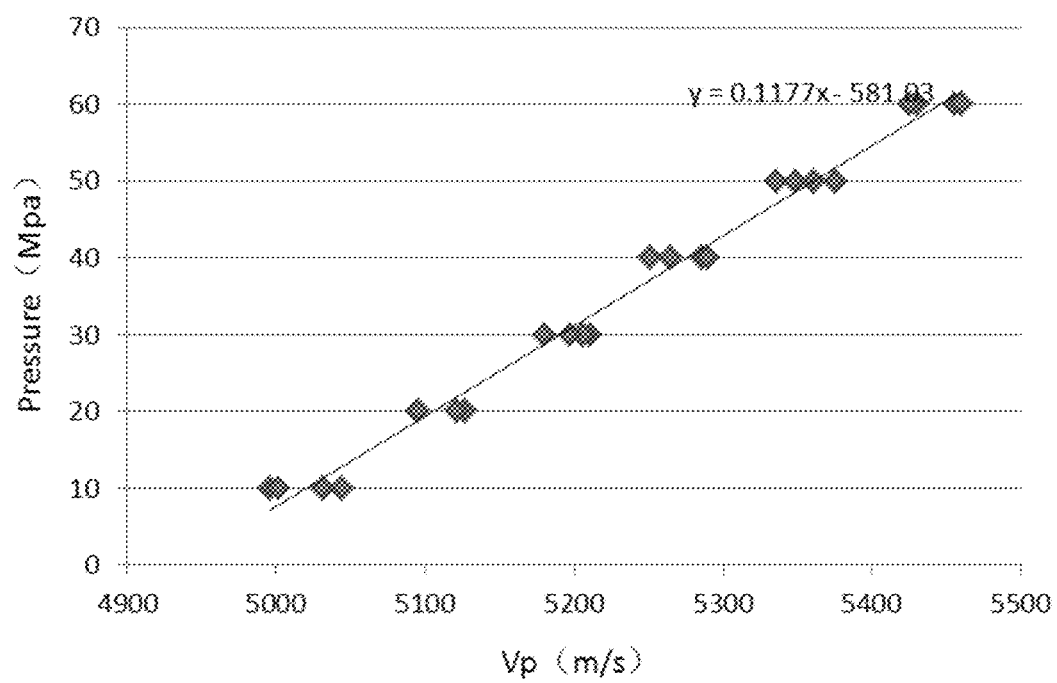
FIG. 7 is a schematic diagram of a linear trend line between a pressure variation and a seismic channel velocity acquired from a core sample.

In this embodiment, FIGS. 5 and 6 are schematic diagrams illustrating linear trend relationships between the velocity and the pressure variation obtained by testing a single rock sample. At least two rock samples can be tested in the same method, and two sets of data can be obtained for each rock sample. One set of data is composed of six scatter points of 20 Hz with their velocities varying with the pressure, and the other set of data is composed of six scatter points of 1 KHz. In this embodiment, the number of rock samples is four. There are four sets of scatter points of 20 Hz with their velocities varying with the pressure, and each set of data is converged and fitted to obtain the linear trend line between the seismic channel velocity and the pressure variation as illustrated in FIG. 7. The relationship between the seismic band velocity and the pressure variation is: $Ys=0.1177Xs-581.03$.

Figure 8:
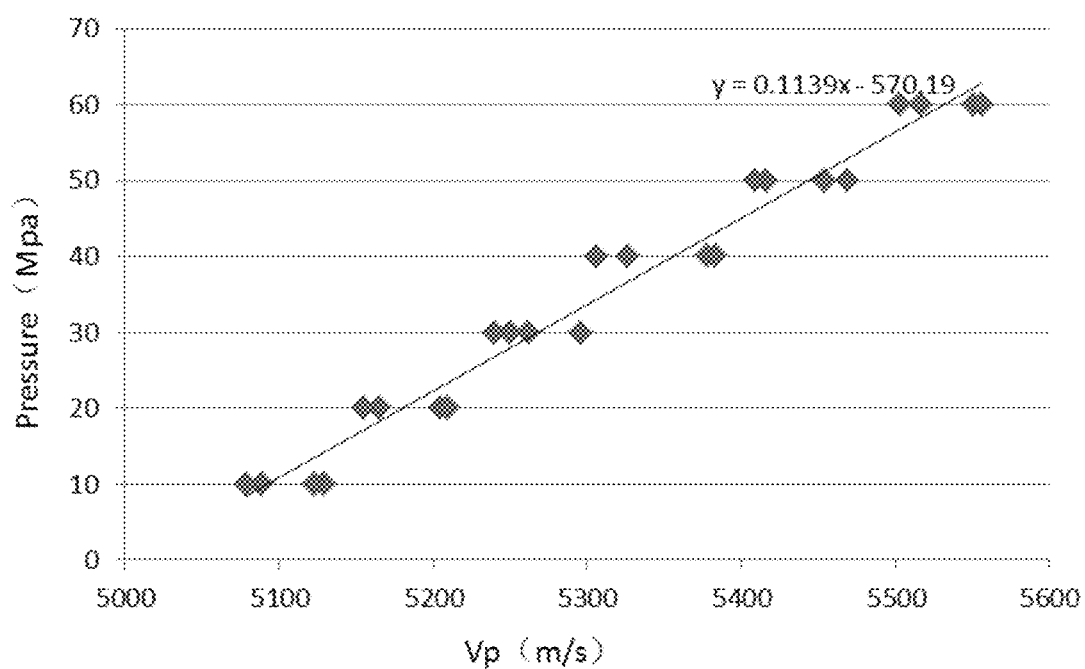
FIG. 8 is a schematic diagram of a linear trend line between a pressure variation and a logging channel velocity acquired from a core sample.

Similarly, there are four sets of scatter points of 1 KHz with their velocities varying with the pressure, and each set of data is converged and fitted to obtain the linear trend line between the logging channel velocity and the pressure variation as illustrated in FIG. 8. The relationship between the logging band velocity and the pressure variation is $Yw=0.1139Xw-570.19$.

Since what calculated is the association between the logging velocity and the seismic velocity under the same stratum pressure, $$Ys=Yw$$

i.e., $0.1177Xs-581.03=0.1139Xw-570.19$, and it can be deduced that $Xs=(0.1139Xw+10.84)/0.1177$, wherein Xs denotes the seismic band velocity, and Xw denotes the logging band velocity.

The function has a statistical average effect. Since the logging data is measured under a stratum condition, the logging data is substituted into $Xs=(0.1139Xw+10.84)/0.1177$ to calculate the seismic velocity under the same stratum condition.

This technical solution completes the correction of the velocity increment of the frequency dispersion by substituting the logging data into $Xs=(0.1139Xw+10.84)/0.1177$.

The Ordovician-Cambrian carbonatite in Chinese western basins develops karst reservoirs. The interior of the carbonate is a massive stratum, and there is no obvious reflected wave impedance interface. In order to study the seismic response characteristics of the carbonate interior reservoir and determine the spatial position of the reservoir in the time domain, a time-depth correspondence should be established.

Whether the time-depth correspondence is accurate should be determined according to two important references in the area where there is no VSP data: 1. the target stratum is drilled through with iconic seismic reflection interfaces at the top and bottom thereof. The time-depth correspondence of the target stratum is relatively reliable as long as the logging stratification is accurate and the logging stratification matches well with the two iconic interfaces. 2. The time-depth correspondence is relatively reliable if the logging-extracted wavelet synthetic seismic record is well correlated to the near-well trace.

Figure 9:
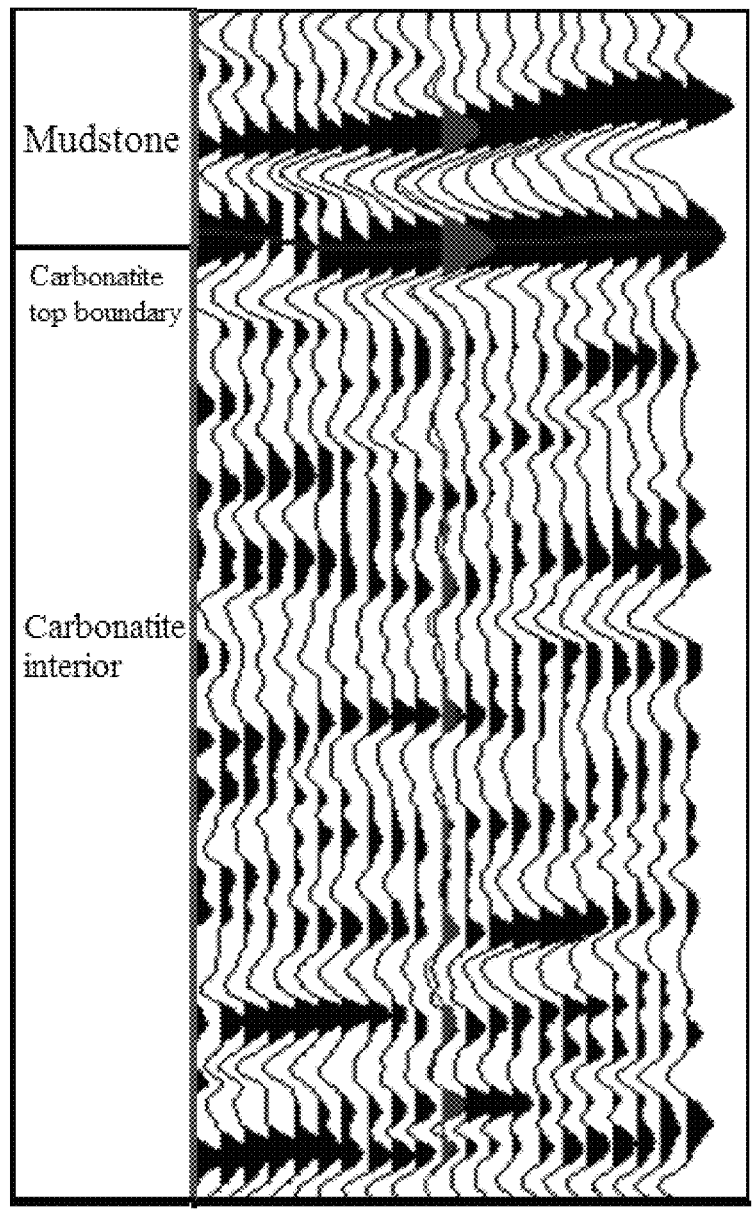
FIG. 9 is a schematic diagram of original disorder seismic records of carbonatite.

For the deep carbonate, the seismic interface that can be referenced for the time-depth calibration is only the strong seismic reflection on a top surface of the carbonate rock, as illustrated in FIG. 9, which is a schematic diagram of original disorder seismic records of carbonatite. Since the interior seismic reflections are disorder, it is difficult to achieve a good similarity between the wavelet synthesis seismic trace and the near-well trace. Thus, the position of the deep carbonate interior reservoir depends only on the travel time of the logging curve on the profile. At that time, the consistency between the velocity of the logging data and the background velocity of the seismic data is very important.

Figure 10:
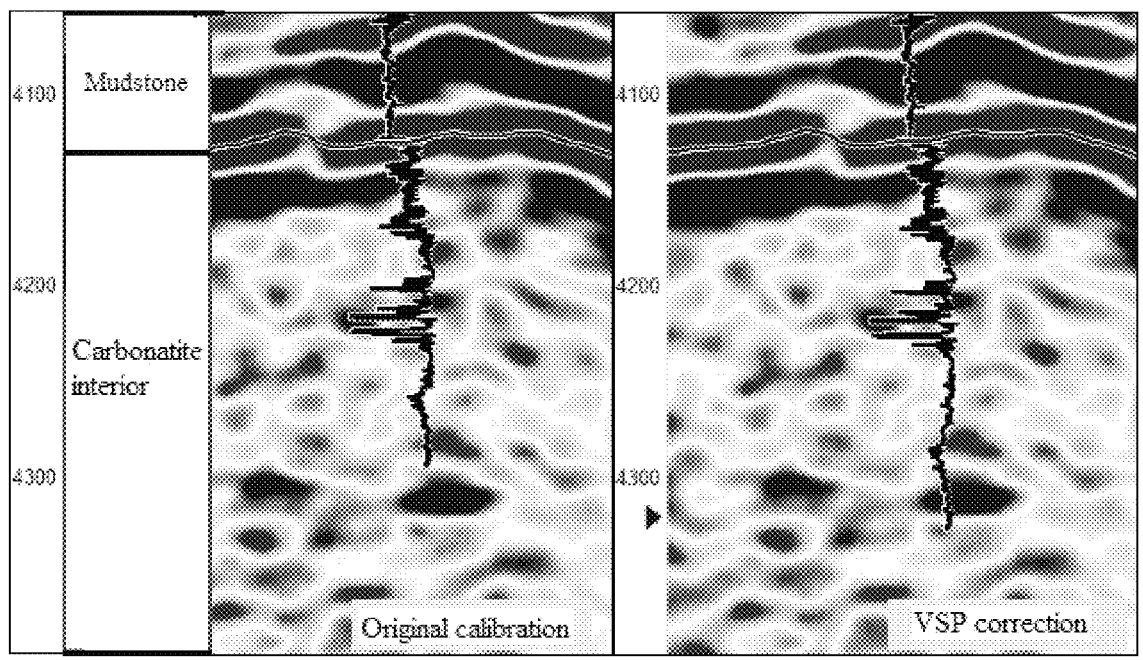
FIG. 10 is a schematic diagram of a comparison between travel time of a logging curve on a time-domain seismic profile before and after a correction of a vertical seismic profile.
Figure 11:
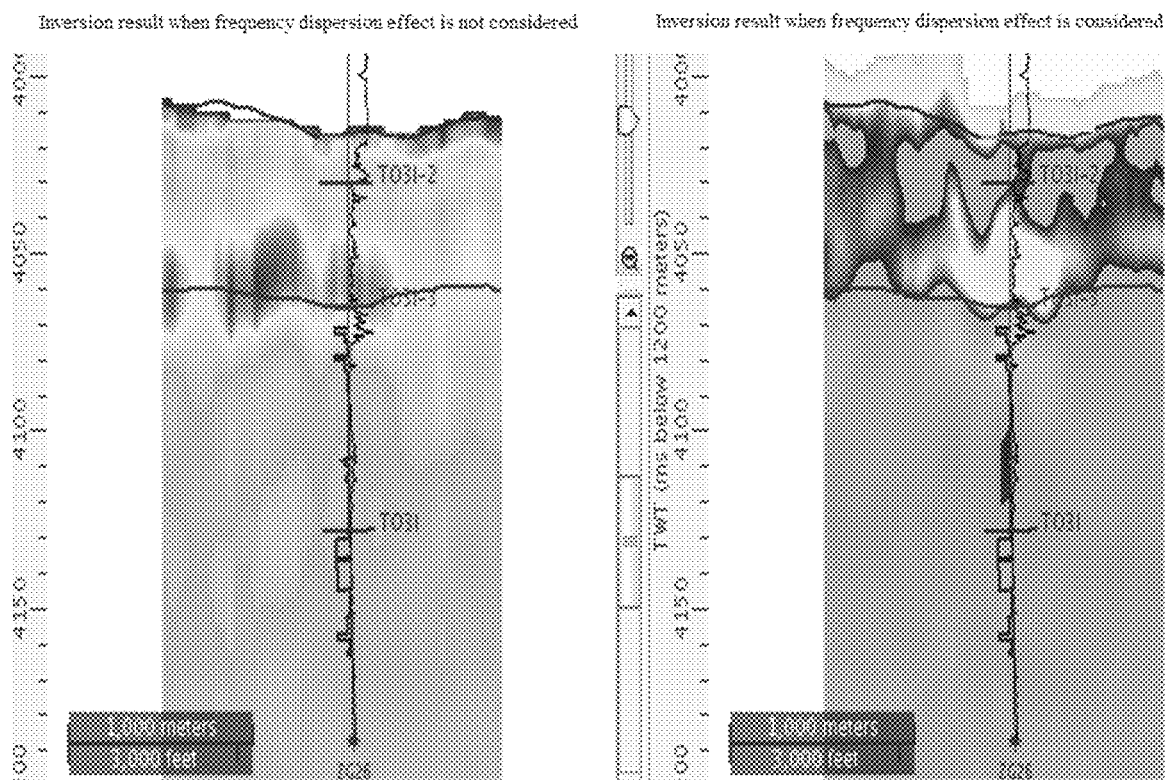
FIG. 11 is a schematic diagram of a comparison between through-well inversion profiles when a frequency dispersion is considered and not considered.

The frequency dispersion characteristic of the fluid-containing stratum leads to mismatching between the velocity of the logging frequency test with the velocity of the seismic frequency test. Therefore, the seismic spatial position of the reservoir determined based on the travel time of the logging curve on the time profile has its reliability decreased. In order to increase the accuracy of the travel time of the logging curve on the time profile, a frequency dispersion correction is performed on the logging curve according to the frequency dispersion relationship obtained in the technical solution, so that the velocity of the logging data is consistent with that of the seismic data as much as possible. As illustrated in FIG. 10, which is a schematic diagram of a comparison between travel time of a logging curve on a time-domain seismic profile before and after a correction of a vertical seismic profile. The time-depth correction is performed for a single well according to the VSP data, and the travel time varies obviously before and after the correction. In order to visually represent the spatial position of the reservoir on the time profile, a frequency dispersion time-depth correction is performed for the Well Z6, and an impedance inversion comparison is performed for the through-well seismic profile, as illustrated in FIG. 11. As can be seen from the inversion result, the spatial position of the reservoir varies before and after the frequency dispersion correction, the logging interpretation result indicates that the reservoir is located at the top of the Stratum To3l-2, and the reservoir position is more accurate after the frequency dispersion correction.

In conclusion, regarding an example of the Ordovician-Cambrian carbonatite in a Chinese western basin, the Ordovician-Cambrian carbonatite stratum shows a continuously deposited massive stratum with a lithology of limestone. The seismic characteristics show that the interior has no obvious impedance interface, and when a local karst reservoir develops, it will form a "beaded" reflection characteristic. By eliminating the logging and seismic frequency dispersion effect, the travel time length of the logging data in the time domain is changed, and the spatial position and distribution pattern of the reservoir are changed in the seismic inversion result. The actual drilling proves that the time-depth calibration after the elimination of the frequency dispersion is more accurate, and the spatial position of the reservoir inversion is consistent with the drilling.

Figure 12:
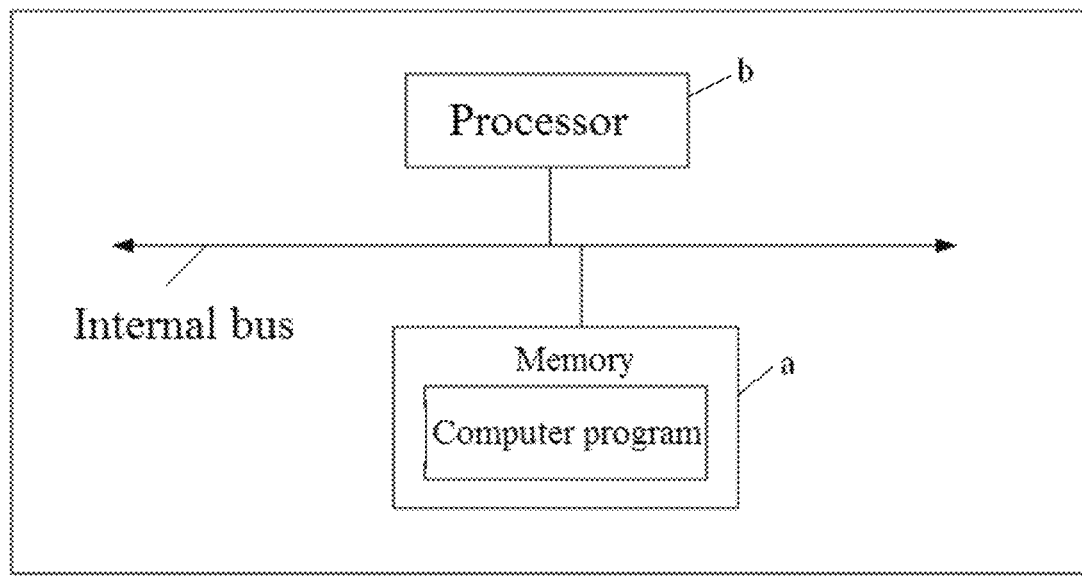
FIG. 12 is a schematic diagram of an apparatus for eliminating a frequency dispersion effect provided by an embodiment of the present disclosure.

As illustrated in FIG. 12, which is a schematic diagram of an apparatus for eliminating a frequency dispersion effect provided by an embodiment of the present disclosure, comprising a memory a, a processor b, and a computer program stored in the memory and runnable in the processor; when executing the computer program, the processor b performs the operations of:

testing a core sample to obtain logging band velocities and seismic band velocities under different pressures;

fitting a relationship between a stratum pressure and the logging band velocity using the logging band velocities under different pressures, and fitting a relationship between the stratum pressure and the seismic band velocity using the seismic band velocities under different pressures;

eliminating a frequency dispersion effect in a target area using the relationship between the stratum pressure and the logging band velocity and the relationship between the stratum pressure and the seismic band velocity.

In the embodiment, during eliminating a frequency dispersion effect in a target area using the relationship between the stratum pressure and the logging band velocity and the relationship between the stratum pressure and the seismic band velocity, when executing the computer program the processor b further performs the operations of:

obtaining a relationship between the seismic band velocity and the logging band velocity using the relationship between the stratum pressure and the logging band velocity and the relationship between the stratum pressure and the seismic band velocity, under the same stratum pressure;

substituting a logging band velocity of logging data in the target area into the relationship between the seismic band velocity and the logging band velocity, so as to obtain a seismic velocity of the target area after the frequency dispersion effect is eliminated.

In the embodiment, during testing a core sample, when executing the computer program, the processor b further performs the operation of:

testing the core sample by a stress-strain system and a DARS system jointly, so as to obtain full-band velocities of the core sample under different pressures.

In the embodiment, when executing the computer program, the processor b further performs the operations of:

drilling a core in the target area, and recording a stratum depth of the drilled core; grinding and polishing a surface of the drilled core, and immersing the drilled core into an organic solution for decontamination processing, so as to obtain the core sample.

In the apparatus for eliminating the frequency dispersion effect provided in the embodiments, the functions realized by the memory and the processor can refer to the foregoing embodiments in the present specification, and the technical effects of the foregoing embodiments can be achieved, which are omitted herein.

Figure 13:
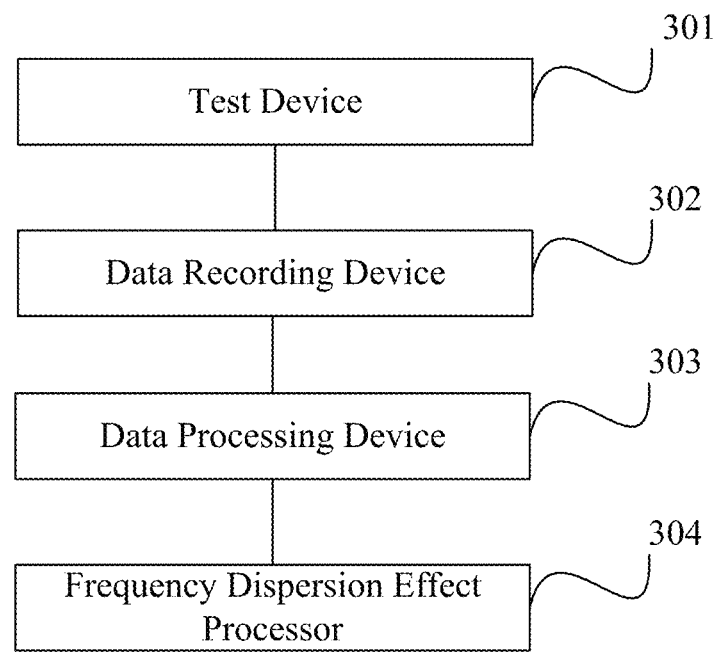
FIG. 13 is a schematic diagram of a system for eliminating a frequency dispersion effect provided in an embodiment of the present disclosure.

As illustrated in FIG. 13, which is a schematic diagram of a system for eliminating a frequency dispersion effect provided in an embodiment of the present disclosure, comprising:

a test device 301, a data recording device 302, a data processing device 303 and a frequency dispersion effect processor 304, wherein, the test device 301 is configured to test a core sample;

the data recording device 302 is configured to record related data generated during a test of the core sample by the test device;

the data processing device 303 is configured to process the related data to obtain logging band velocities and seismic band velocities under different pressures; fit a relationship between a stratum pressure and the logging band velocity using the logging band velocities under different pressures, and fit a relationship between the stratum pressure and the seismic band velocity using the seismic band velocities under different pressures;

the frequency dispersion effect processor 304 is configured to eliminate a frequency dispersion effect in a target area using the relationship between the stratum pressure and the logging band velocity and the relationship between the stratum pressure and the seismic band velocity.

In the embodiment, the frequency dispersion effect processor 304 is further configured to obtain a relationship between the seismic band velocity and the logging band velocity using the relationship between the stratum pressure and the logging band velocity and the relationship between the stratum pressure and the seismic band velocity, under the same stratum pressure; and substitute a logging band velocity of logging data in the target area into the relationship between the seismic band velocity and the logging band velocity, so as to obtain a seismic velocity of the target area after the frequency dispersion effect is eliminated.

The embodiment further comprises a core sample obtaining device configured to drill a core in the target area, and record a stratum depth of the drilled core; grind and polish a surface of the drilled core, and immerse the drilled core into an organic solution for decontamination processing, so as to obtain the core sample.

In this embodiment, the processor may be implemented in any suitable manner. For example, the processor may take the form of, for example, a microprocessor, a processor, a computer readable medium storing computer readable program codes (e.g. software or firmware) executable by the (micro)processor, a logic gate, a switch, an Application Specific Integrated Circuit (ASIC), a programmable logic controller, or an embedded microcontroller.

In the 1990s, it is easy to distinguish whether a technical improvement is a hardware improvement (for example, an improvement to a circuit structure such as diode, transistor, switch, etc.), or a software improvement (an improvement to a methodical flow). However, with the development of technologies, improvements to many methodical flows nowadays can be regarded as direct improvements to the hardware circuit structures. Almost all of the designers obtain the corresponding hardware circuit structures by programming the improved methodical flows into the hardware circuits. Therefore, it should be deemed that an improvement to a methodical flow cannot be implemented with a hardware entity module. For example, a Programmable Logic Device (PLD) (e.g., Field Programmable Gate Array (FPGA)) is an integrated circuit having logical functions determined by the user's programming of the device. The designer programs by himself to "integrate" a digital system onto a piece of PLD, without needing to design and manufacture the ASIC chip by the chip manufacturer. Moreover, at present, instead of manually manufacturing the integrated circuit chips, such programming is mostly implemented using software "logic compiler", which is similar to the software compiler used for the program development, and the original codes to be compiled should be written in a specific programming language referred to as Hardware Description Language (HDL). There are many kinds of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc., and currently the most commonly used is Very-High-Speed Integrated Circuit Hardware Description Language (VHDL) and Verilog2. It should also be apparent to those skilled in the art that a hardware circuit that implements the logic methodical flow can be easily obtained just by slightly logically programming the methodical flow into an integrated circuit with the aforementioned hardware description languages.

Those skilled in the art also know that, in addition to implementing the client and the server purely with computer-readable program codes, the client and the server can be enabled to realize the same functions in the form of, for example, a logic gate, a switch, an Application Specific Integrated Circuit (ASIC), a programmable logic controller, or an embedded microcontroller by logically programming the methodical steps. Therefore, the client and the server may be considered as hardware components, and the devices included therein for realizing various functions may also be regarded as structures within the hardware components. Alternatively, the devices for realizing various functions even may be deemed as both software modules that implement the methods and structures within the hardware components.

As can be seen from the descriptions of the above embodiments, those skilled in the art can clearly understand that the technical solutions can be implemented by means of software plus a necessary universal hardware platform. Based on this understanding, the essence of the technical solution of the present disclosure or the part making a contribution to the prior art can be embodied in the form of a computer software product, which may be stored in a storage medium, such as a ROM/RAM, a magnetic disk, an optical disk, etc., and include several instructions to enable a computer device (a personal computer, a server, a network device, etc.) to carry out the embodiments of the present disclosure, or methods described in some parts of the embodiments.

Each embodiment in the Specification is described in a progressive manner. Each embodiment lays an emphasis on its difference from other embodiments, and the same or similar parts of the embodiments can refer to each other. In particular, each embodiment of the client may refer to the description of the forgoing method embodiments.

The technical solutions may be described in the general context of the computer-executable instructions, such as program modules. Generally, the program modules include routines, programs, objects, components, data structures, etc. that perform particular tasks or realize particular abstract data types. The technical solutions may also be practiced in distributed computing environments where tasks are performed by remote processing devices connected through a communication network. In a distributed computing environment, the program modules may be located in either local or remote computer storage media including storage devices.

Although the technical solutions are described by way of embodiments, those skilled in the art will understand that there are many modifications and changes of the technical solutions without departing from the spirit of the technical solutions, and it is intended that the appended claims include the modifications and changes without departing from the spirit of the technical solutions.

The invention claimed is:

1. A method for eliminating a frequency dispersion effect, comprising:
    testing a core sample to obtain logging band velocities and seismic band velocities under different pressures;
    fitting a relationship between a stratum pressure and the logging band velocity using the logging band velocities under different pressures, and fitting a relationship between the stratum pressure and the seismic band velocity using the seismic band velocities under different pressures; and
    eliminating a frequency dispersion effect in a target area using the relationship between the stratum pressure and the logging band velocity and the relationship between the stratum pressure and the seismic band velocity.

2. The method according to claim 1, wherein the step of eliminating a frequency dispersion effect in a target area comprises:
    obtaining a relationship between the seismic band velocity and the logging band velocity using the relationship between the stratum pressure and the logging band velocity and the relationship between the stratum pressure and the seismic band velocity, under the same stratum pressure; and
    substituting a logging band velocity of logging data in the target area into the relationship between the seismic band velocity and the logging band velocity, so as to obtain a seismic velocity of the target area after the frequency dispersion effect is eliminated.

3. The method according to claim 1, wherein the step of obtaining logging band velocities and seismic band velocities under different pressures comprises:
    testing the core sample by a stress-strain system and a low frequency rock physical modulus detection instrument based on acoustic resonance spectrometry jointly, so as to obtain full-band velocities of the core sample under different pressures.

4. The method according to claim 1, wherein the step of obtaining the core sample comprises:
drilling a core in the target area, and recording a stratum depth of the drilled core; and
grinding and polishing a surface of the drilled core, and immersing the drilled core into an organic solution for decontamination processing, so as to obtain the core sample.

5. An apparatus for eliminating a frequency dispersion effect, comprising a memory, a processor, and a computer program stored in the memory and runnable in the processor; when executing the computer program, the processor performs the operations of:
testing a core sample to obtain logging band velocities and seismic band velocities under different pressures;
fitting a relationship between a stratum pressure and the logging band velocity using the logging band velocities under different pressures, and fitting a relationship between the stratum pressure and the seismic band velocity using the seismic band velocities under different pressures; and
eliminating a frequency dispersion effect in a target area using the relationship between the stratum pressure and the logging band velocity and the relationship between the stratum pressure and the seismic band velocity.

6. The apparatus according to claim 5, wherein during eliminating a frequency dispersion effect in a target area using the relationship between the stratum pressure and the logging band velocity and the relationship between the stratum pressure and the seismic band velocity, when executing the computer program, the processor further performs the operations of:
obtaining a relationship between the seismic band velocity and the logging band velocity using the relationship between the stratum pressure and the logging band velocity and the relationship between the stratum pressure and the seismic band velocity, under the same stratum pressure; and
substituting a logging band velocity of logging data in the target area into the relationship between the seismic band velocity and the logging band velocity, so as to obtain a seismic velocity of the target area after the frequency dispersion effect is eliminated.

7. The apparatus according to claim 5, wherein during testing a core sample, when executing the computer program, the processor further performs the operation of:
testing the core sample by a stress-strain system and a low frequency rock physical modulus detection instrument based on acoustic resonance spectrometry jointly, so as to obtain full-band velocities of the core sample under different pressures.

8. The apparatus according to claim 5, wherein when executing the computer program, the processor further performs the operations of:
drilling a core in the target area, and recording a stratum depth of the drilled core; and
grinding and polishing a surface of the drilled core, and immersing the drilled core into an organic solution for decontamination processing, so as to obtain the core sample.

9. A system for eliminating a frequency dispersion effect, comprising:
a test device, a data recording device, a data processing device and a frequency dispersion effect processor, wherein,
the test device is configured to test a core sample;
the data recording device is configured to record related data generated during a test of the core sample by the test device;
the data processing device is configured to process the related data to obtain logging band velocities and seismic band velocities under different pressures; fit a relationship between a stratum pressure and the logging band velocity using the logging band velocities under different pressures, and fit a relationship between the stratum pressure and the seismic band velocity using the seismic band velocities under different pressures; and
the frequency dispersion effect processor is configured to eliminate a frequency dispersion effect in a target area using the relationship between the stratum pressure and the logging band velocity and the relationship between the stratum pressure and the seismic band velocity.

10. The system according to claim 9, wherein the frequency dispersion effect processor is further configured to obtain a relationship between the seismic band velocity and the logging band velocity using the relationship between the stratum pressure and the logging band velocity and the relationship between the stratum pressure and the seismic band velocity, under the same stratum pressure; and substitute a logging band velocity of logging data in the target area into the relationship between the seismic band velocity and the logging band velocity, so as to obtain a seismic velocity of the target area after the frequency dispersion effect is eliminated.

11. The system according to claim 9, further comprising:
a core sample obtaining device configured to:
drill a core in the target area, and record a stratum depth of the drilled core; and
grind and polish a surface of the drilled core, and immerse the drilled core into an organic solution for decontamination processing, so as to obtain the core sample.

* * * * *